United States Patent [19]

Olechowski

[11] Patent Number: 4,536,333

[45] Date of Patent: Aug. 20, 1985

[54] METHOD OF POLYMERIZING ROSIN

[75] Inventor: Jerome R. Olechowski, Lawrenceville, N.J.

[73] Assignee: Union Camp Corporation, Wayne, N.J.

[21] Appl. No.: 643,248

[22] Filed: Aug. 22, 1984

[51] Int. Cl.³ .................. C08H 11/00; C08F 1/00
[52] U.S. Cl. ................................... 260/99.5
[58] Field of Search ..................... 260/99.5

[56]  References Cited

U.S. PATENT DOCUMENTS

| | | | |
|---|---|---|---|
| 2,108,928 | 2/1938 | Rummelsburg | 260/99.5 |
| 2,136,525 | 11/1938 | Rummelsburg | 260/99.5 |
| 2,251,806 | 8/1941 | Rust et al. | 260/101 |
| 2,307,641 | 1/1943 | Rummelsburg | 260/99.5 |
| 2,322,316 | 6/1943 | Rummelsburg | 260/99.5 |
| 2,328,681 | 9/1943 | Rummelsburg | 260/99.5 |
| 2,375,618 | 5/1945 | Bried | 260/99.5 |
| 2,492,146 | 12/1949 | Hampton | 260/99.5 |
| 2,515,218 | 7/1950 | Hampton | 260/99.5 |
| 2,532,120 | 11/1950 | Rummelsburg | 260/103 |
| 4,105,462 | 8/1978 | Thanos | 260/104 |
| 4,414,146 | 11/1983 | Olechowski | 260/99.5 |
| 4,477,613 | 10/1984 | Evans et al. | 524/187 |

Primary Examiner—Herbert S. Cockeram
Attorney, Agent, or Firm—Kane, Dalsimer, Kane, Sullivan & Kurucz

[57]  ABSTRACT

Formic acid is disclosed as a catalyst for polymerizing rosin. The discovery is the basis of a method for polymerizing rosin by heating the rosin in the presence of a catalytic proportion of formic acid. The catalyst is easily separated from the polymerized rosin for reuse.

14 Claims, No Drawings

METHOD OF POLYMERIZING ROSIN

BACKGROUND OF THE INVENTION

1. Field of the Invention

The invention relates to methods of polymerizing rosin.

2. Brief Description of the Prior Art

The term "polymerized rosin" refers to the resinous mixture obtained when rosin is treated under various conditions with strong inorganic acids, organic acids or acidic clays. The mixture comprises non-dimerizable resin acids such as dehydroabietic acid, resin acids containing some unsaturation which do not react and a number of different types of polymerized resin acids including dimerized resin acids. The mixture also contains a minor amount of esters, resin acid anhydrides and non-saponifiable substances. Polymerized rosin may be refined, usually by distillation, to remove some portion of the monomeric resin acids and other substances to produce a mixture containing a higher concentration of polymerized resin acids. This refined mixture always has a higher softening point than unrefined polymerized rosin and it is referred to as "dimerized rosin" in many textbooks.

Much prior art exists that bears upon the conversion of rosin to a more polymeric substance. Among the literature descriptions of prior art methods, U.S. Pat. Nos. 2,136,525; 2,108,982; 2,307,641; and 2,328,681 are examples; also the U.S. Pat. Nos. 2,515,218; 2,251,806; 2,532,120; and 4,105,462.

Previous methods described for polymerizing rosin have relied on the use of strong inorganic acids, such as sulfuric acid as the catalysts. In these procedures, the rosin is dissolved in an inert solvent during the polymerization reaction. A serious disadvantage of these methods is the formation of an acidic sludge that requires separation from the polymerized product.

Alternate methods have been described in which the catalysts are sulfonated organic polymers (U.S. Pat. No. 4,414,146), or a halogenated methanesulfonic acid (U.S. Pat. No. 4,339,377). The reaction is generally carried out in an inert organic solvent. Thus, the prior art for the polymerization of rosin includes both a catalyst and a solvent.

The present invention is an improvement over the prior art in that the polymerization is effected by formic acid which acts as both a solvent and a catalyst. This is unexpected in that two prior patents U.S. Pat. Nos. 2,375,618 and 2,492,146 teach against the operability of formic acid to function as such a catalyst. In fact, U.S. Pat. No. 2,375,618 specifically states that "heating rosin with an aliphatic carboxylic acid alone does not result in the preparation of a material of increased softening point". The polymerized rosin is recovered by a simple distillation of the solvent, formic acid. Furthermore, the latter can be effectively reused for subsequent cycles of polymerization. An additional advantage is that formic acid is an inexpensive and stable reagent.

The product formed by the formic acid procedure consists of 27–45% dimerized rosins, a yield comparable to those obtained by other methods. The dimerized rosins residue, left after distillation of the formic acid, can be directly esterified without prior purification of the dimer. The oxidation stability and physical properties of the dimerized rosin compare favorably with commercially available products, such as Sylvatac 95, produced by the Sylvachem Division of SCM Corporation.

SUMMARY OF THE INVENTION

The invention comprises the polymerization of rosin in the presence of a catalytic proportion of formic acid.

DETAILED DESCRIPTION OF THE INVENTION

The method of the invention is based on the discovery that formic acid is an effective catalyst for promoting the polymerization of rosin. Rosins which may be advantageously polymerized by the method of the invention are represented by tall oil rosin, wood rosin and gum rosin.

The method of the invention may be carried out by simply mixing the rosin with a catalytic proportion of formic acid and heating the mixture to a temperature within the range of from about 10° C. to about reflux temperature. Preferably the mixture is heated to a temperature of from about 90° to about 150° C. Advantageously, the mixture is agitated by stirring during the period of heating.

Advantageously, the proportion of rosin to formic acid is 1:1 to 3:1 by weight.

Progress of the desired polymerization may be followed by employment of conventional analytical techniques. In general, polymerization is complete within about 1 to 12 hours at the preferred temperatures.

Upon completion of the polymerization, the desired product may be separated from the reaction mixture by distillation to remove residual formic acid.

Formic acid is a well known reagent as is the method of its preparation. In the method of the invention, it is employed in a substantially anhydrous form, i.e., for example 97% formic acid. In such a form, a catalytic proportion comprises from about 0.5 to about 20 weight percent of the reaction mixture, preferably 1 to 5 weight percent in the presence of a solvent of high dielectric constant.

In a preferred embodiment process of the invention, additional formic acid is present in the reaction mixture as solvent for the reactant rosin. Under these circumstances, the formic acid present in the reaction mixture may comprise 20 to 50 weight percent of the reaction mixture. Other solvents may also be employed, particularly polar solvents and solvents having a high dielectric constant, preferably greater than 40.

Representative of these solvents are toluene, xylene, and the like; halogenated hydrocarbons such as carbon tetrachloride, ethylene dichloride and the like; oxygenated solvents such as sulfolane, acetic acid and the like.

In another embodiment process of the invention, the solvent and catalyst formic acid is recovered and reused in further polymerization of rosin.

Those skilled in the art will appreciate that many modifications may be made to the above-described embodiments of the invention without departing from the spirit and the scope of the invention. For example, the process of the invention may also employ as co-catalysts, any of the known rosin polymerization catalysts such as inorganic mineral acids and strong organic acids. Particularly preferred as co-catalysts are perchloric acid, p-toluenesulfonic acid, trifluoromethanesulfonic acid and methanedisulfonic acid, solid acid catalysts such as acid clays, such as filtrol-13 and the like, strongly acidic macroreticular resins, such as Amberlyst 15 and the like.

The following examples describe the process of making and using the invention and the best mode contemplated by the inventor of carrying out the invention but are not to be considered as limiting.

EXAMPLE 1

After the addition of 100 g of 97% formic acid and 100 g of rosin (Unitol NCY; Union Camp Corp., Wayne, N.J.) to a suitable size reflux vessel, the mixture was heated to reflux temperature (105° C.). Samples of the resulting reaction mixture were withdrawn after 1, 2 and 3 hours for analytical purposes. The monomer and dimer contents of the samples at each time point were determined by gel permeation chromatography (GPC). The final product, obtained after distillation of the formic acid, was analyzed in a similar manner.

The formic acid recovered from the first cycle was used as a polymerization solvent and catalyst with a fresh batch of rosin. This procedure was repeated a third time. As in a first cycle, samples were also analyzed for the extent of dimerization during the second and third cycles.

The analytical results summarized in Table 1 below indicate that each cycle yielded approximately 27% of the dimerized rosin.

TABLE 1

FORMIC ACID DIMERIZATION OF ROSIN
$HCO_2H$/Rosin 50/50 W/W

| $HCO_2H$ USE | TIME HRS. | SOFTEN-ING POINT °C. | % DIMER GPC | % $HCO_2H$ RECOVERED BY DISTILLA-TION |
|---|---|---|---|---|
| Initial 1st | 1,0 | — | 22 | 94 |
| Cycle | 2,0 | — | 25 | |
| | 3,0 | — | 27 | |
| Stripped Sample | — | 88 | 29 | 95 |
| 2nd Cycle | 1,0 | — | 17 | |
| | 2,0 | — | 21 | |
| | 3,0 | — | 24 | |
| Stripped Sample | — | 88 | 27 | 95 |
| 3rd Cycle | 1,0 | — | 20 | |
| | 2,0 | — | 21 | |
| | 3,0 | — | 24 | |
| Stripped Sample | — | 88 | 27 | |

EXAMPLE 2

One hundred grams of rosin (Unitol NCY, supra.) was added to one hundred grams of 97% formic acid in a suitable vessel. The mixture was heated to a temperature of circa 100° C. for a period of about 3 hours. At the end of this time the reaction mixture was allowed to cool to room temperature and poured into an excess (V/V) of water. The insoluble dimerized rosin was taken up in ether. The ether solution was washed, dried over anhydrous sodium sulfate and stripped of ether to yield a product containing 25.9 percent dimerized rosin (GPC).

EXAMPLE 3

The procedure of Example 1, supra., was repeated except that 50 grams of the formic acid was replaced with an equal proportion of toluene. The product showed a dimer content of 14.3 percent.

EXAMPLE 4

The procedure of Example 2, supra., was repeated except that when the temperature of the reaction mixture first reached 100° C., 1 weight percent of 70% perchloric acid was added to the reaction mixture and when the reaction mixture was poured into an excess of water, sodium carbonate was added to neutralize the perchloric acid. The product showed a dimer content of 43.8 percent.

EXAMPLE 5

The procedure of Example 1, supra., was repeated except that when the temperature of the reaction mixture first reached 100° C., 0.5 weight percent of para-toluenesulfonic acid monohydrate was added to the reaction mixture. After workup the product showed a dimer content of 37.8 percent.

EXAMPLE 6

The procedure of Example 1, supra., was repeated except that 0.5 weight percent of methanedisulfonic acid was added to the reaction mixture. Upon workup the product showed a dimer content of 39.4 percent.

EXAMPLE 7

The procedure of Example 1, supra., was repeated except that 0.5 weight percent of a macroreticular sulfonic acid resin such as Amberlyst 15 was added to the reaction mixture. The macroreticular resin was filtered off after the reaction mixture was allowed to cool to room temperature. Upon workup the product showed a dimer content of 29.6 percent.

EXAMPLE 8

The procedure of Example 1, supra., was repeated except that 0.5 weight percent of trifluoromethanesulfonic acid was added to the reaction mixture. Upon workup the product showed a dimer content of 39.7 percent.

EXAMPLE 9

The procedure of Example 2, supra., was repeated except that 98 grams of the formic acid was replaced by sulfolane. The product showed a dimer content of 19.8 percent and a softening point of 85° C.

What is claimed:

1. A method for the polymerization of rosin, which comprises; mixing catalytic proportions of a catalyst consisting essentially of formic acid with the rosin; and heating the mixture.

2. The method of claim 1 wherein formic acid is also added to the mixture in a solvating proportion.

3. The method of claim 1 wherein the rosin is selected from the group consisting of tall oil rosin, wood rosin and gum rosin.

4. The method of claim 3 wherein the rosin is tall oil rosin.

5. The method of claim 3 wherein the rosin is wood rosin.

6. The method of claim 3 wherein the rosin is gum rosin.

7. The method of claim 2 wherein the proportion of rosin and formic acid is 1:1 by weight.

8. The method of claim 7 wherein the concentration of formic acid is 95–100%.

9. The method of claim 1 including a step after heating wherein the formic acid is recovered by distillation and reused for subsequent rosin polymerization.

10. The method of claim 9 wherein the formic acid recovered is reused in several additional cycles of polymerization.

11. The method of claim 2 wherein the proportion of rosin and formic acid is 3:1 by weight.

12. The method of claim 1 carried out in the presence of a solvent which is a material with a dielectric constant of greater than 40.

13. The method of claim 12 wherein the formic acid comprises from about 0.5 to about 20 weight percent of the rosin.

14. The method of claim 13 wherein the formic acid comprises from about 0.5 to about 5 weight percent of the rosin.

* * * * *

UNITED STATES PATENT AND TRADEMARK OFFICE
CERTIFICATE OF CORRECTION

PATENT NO. : 4,536,333
DATED : August 20, 1985
INVENTOR(S) : Jerome R. Olechowski It is certified that error appears in the above-identified patent and that said Letters Patent is hereby corrected as shown below:

Col. 3, Table 1, fifth column of Table 1; delete "94" and insert -- 94 opposite 3.0 - 27 -- .

Col. 3, Table 1, fifth column of Table 1; delete "95" and insert -- 95 opposite 3.0 - 24 -- .

Col. 3, Table 1, fifth column of Table 1; delete "95" and insert -- 95 opposite 3.0 - 24 -- .

Signed and Sealed this

Twenty-sixth Day of November 1985

[SEAL]

Attest:

DONALD J. QUIGG

Attesting Officer

Commissioner of Patents and Trademarks